(12) United States Patent
Zhang et al.

(10) Patent No.: US 11,969,826 B2
(45) Date of Patent: Apr. 30, 2024

(54) ROBOT-BASED LASER CLADDING METHOD AND SYSTEM FOR MEMBRANE WALL

(71) Applicants: Chengrui Zhang, Jinan (CN); Yisheng Yin, Dalian (CN)

(72) Inventors: Chengrui Zhang, Jinan (CN); Yisheng Yin, Dalian (CN)

( * ) Notice: Subject to any disclaimer, the term of this patent is extended or adjusted under 35 U.S.C. 154(b) by 0 days.

(21) Appl. No.: 18/346,952

(22) Filed: Jul. 5, 2023

(65) Prior Publication Data
US 2024/0009772 A1  Jan. 11, 2024

(30) Foreign Application Priority Data
Jul. 6, 2022 (CN) .................. 2022107970963.2

(51) Int. Cl.
| | |
|---|---|
| *B23K 26/354* | (2014.01) |
| *B23K 26/03* | (2006.01) |
| *B23K 26/08* | (2014.01) |
| *B23K 26/082* | (2014.01) |

(52) U.S. Cl.
CPC .......... *B23K 26/354* (2015.10); *B23K 26/032* (2013.01); *B23K 26/082* (2015.10); *B23K 26/0884* (2013.01)

(58) Field of Classification Search
CPC ............................ B23K 26/354; B23K 26/032
See application file for complete search history.

(56) References Cited

U.S. PATENT DOCUMENTS

2022/0143704 A1* 5/2022 Tran ..................... B23K 26/342

FOREIGN PATENT DOCUMENTS

| CN | 105195868 A | * | 12/2015 | ........... B23K 31/125 |
| CN | 109226937 A | * | 1/2019 | ............. B23K 9/127 |
| CN | 110052704 A | * | 7/2019 | ........... B23K 26/032 |
| CN | 112959329 A | * | 6/2021 | ........... B23K 26/044 |

OTHER PUBLICATIONS

Translation of CN-105195868-A (Year: 2015).*
Translation of CN-109226937-A (Year: 2019).*
(Continued)

*Primary Examiner* — Elizabeth M Kerr
(74) *Attorney, Agent, or Firm* — Zhigang Ma

(57) ABSTRACT

A robot-based laser cladding method for membrane wall is provided, and includes: step 1: installing a laser line scanning sensor and a laser cladding head in parallel with a forward-bias in feed direction; step 2: storing extracted feature points into a feature point buffer; step 3: installing an industrial camera at a certain angle with the laser cladding head, making a collection range of the industrial camera follow closely a current cladding position; a robot-based laser cladding system for membrane wall is provided, and includes a data collection system, a data processing system, a detection and correction system, and a motion control system. A speed dynamical prospect is used for performing a speed planning. The above speed dynamical prospect dynamically adjusts a prospective read-ahead segment number N, compared to planning method with fixed read-ahead segment number, the dynamic speed prospect has a smoother cladding speed and more stable cladding quality.

5 Claims, 9 Drawing Sheets

(56) References Cited

OTHER PUBLICATIONS

Translation of CN-110052704-A (Year: 2019).*
Translation of CN-112959329-A (Year: 2021).*
CNIPA, Notification of a First Office Action for CN202210797096. 3, dated Feb. 14, 2023.
Shandong University (Applicant), Reply to Notification of a First Office Action for CN202210797096.3.X, w/ (allowed) replacement claims, dated Apr. 11, 2023.
CNIPA, Notification to grant patent right for invention in CNCN202210797096.3, dated Apr. 27, 2023.

* cited by examiner

ROBOT-BASED LASER CLADDING METHOD AND SYSTEM FOR MEMBRANE WALL

TECHNICAL FIELD

The disclosure relates to the field of robot laser cladding processing technologies, and more particularly to a robot-based laser cladding method and system for membrane wall.

BACKGROUND

Laser cladding technology is an advanced material surface modification technology, it uses a radiation effect of a high-energy laser beam on a surface of a matrix material to rapidly produce effects of local high-temperature melting, expansion and cooling to achieve an organic combination of the matrix material and a material with target physicochemical properties, so as to significantly improve properties of the surface of the matrix material such as corrosion resistance, abrasion resistant and antioxidant, and improve a surface strength of the matrix material. As a high and new technology developed in recent years, the laser cladding technology has advantages such as high energy density, fast cooling speed, and significant bonding effect between a coating and a matrix compared with other surface processing and repair technology (such as welding and spraying). Thus, the laser cladding technology is widely used in aerospace, electronic components, mold repair, automobiles, ships, petrochemical and other fields, and the laser cladding technology has a broad application prospect.

Currently, for a large format laser cladding, an industrial six-axis robot equipped with a laser cladding head is generally used for cladding operations. In related art, the laser cladding head is made to move according to a programmed trail through a teaching programing for the industrial six axis robot, and powder is melted by using a high-density energy of a laser to make the melted powder form a clad layer in a surface of the matrix material, which can achieve a purpose of surface quality optimization. However, with laser cladding processing, a local high temperature can be generated, a sculptured surface can undergo thermal deformation due to the high temperature, if a laser cladding trail is not dynamically adjusted after the thermal deformation, a cladding defect will be caused, and this situation is particularly evident for an application of the large format laser cladding, such as membrane wall laser cladding (also referred to as laser cladding for membrane wall). Meanwhile, the teaching programing also has problems such as low efficiency and poor flexibility, and the teaching programing is not suitable for application scenarios of small-scale complex workpiece production. Aimed at problems existed in the above teaching programing, an existing study provides an offline programming technology, A Chinese patent application NO. CN201811356468.9 (corresponding to patent publication NO. CN109226937A) provides an industrial robot space intersecting curve welding offline programming method, however inventor discovers that a welding line trajectory of the above application document is generated by extracting a welding line node of an original three-dimensional model, thus the method cannot overcome a problem of trail deviation generated by the thermal deformation during a repair process. Similarly, a Chinese patent application NO. CN201510769050.0 (corresponding to patent publication NO. CN105195868A) provides a robot welding system and welding method thereof, the inventor discovers that a welding trail collision prevention planning mentioned in the above application document is performed offline, the welding trail essentially does not effectively handle the thermal deformation generated during the processing. Therefore, the above offline processing method cannot overcome the problem generated by the thermal deformation. Aimed at problems existed in the above offline processing method, the existing study uses an industrial camera and a laser line scanning sensor for performing online tracking plans, for example, a Chinese patent application NO. CN202110366806.2 (corresponding to patent publication NO. CN112959329A), the inventor discovers a bias between a welding gun and a camera in the application document, an executed welding trail is pre-planned, and it can merely reduce an effect of the thermal deformation generated by a processed welding channel on a workpiece contour in a certain extent, due to a forward-biased existed between a sensor and the welding gun, the sensor is unable to perceive the thermal deformation generated by a current welding position of a current welding channel on a next welding position of the current welding channel. An influence of laser cladding powder and splashing is considered, a forward-biased distance of an online tracking sensor will be relatively large, therefore, if the thermal deformation generated by both the processed and current melt channels is not considered simultaneously, and dynamic adjustment of the robot pose is performed, a quality of cladding can be affected and cladding defects can be easily caused.

In conclusion, it is not possible to overcome the effect of the thermal deformation generated by both the processed and current melt channels on the workpiece contour simultaneously based on the related art.

SUMMARY

1. A Technical Problem to be Solved is as Follows

A purpose of the disclosure is to solve a problem of effect of a thermal deformation generated by a processed melt channel and a current melt channel on a workpiece contour cannot be simultaneously overcome in related art, and to provide a robot-based laser cladding method and system for membrane wall.

2. Technical Solutions are as Follows

In order to achieve the above purpose, the disclosure uses the following technical solutions.

The disclosure provides a robot-based laser cladding method for membrane wall, and the method includes:

step 1: installing a laser line scanning sensor and a laser cladding head in parallel with a forward-bias between the laser line scanning sensor and the laser cladding head in a feed direction, where a distance of the forward-bias is determined based on a disturbance of powder and splash; installing an industrial camera to make the industrial camera lag behind the laser cladding head in an installation space by a bias distance and to make the industrial camera to have a certain angle relative to the laser cladding head, where a collection range of the industrial camera follow closely a current cladding position, and the collection range of the industrial camera is within 15 millimeters (mm) from the current cladding position; online tracking and scanning a contour of a membrane wall of a processed melt channel by using the laser line scanning sensor, and executing a feature point extraction task to extract feature points defining a trail of a current melt channel, where a thermal deformation generated by a previous melt channel tends to deform the contour of the membrane wall, the laser line scanning sensor is configured to extract the feature points in an online tracking and scanning manner, and the thermal deformation generated by the previous melt channel on the contour of the membrane wall of the current melt channel is determined based on information of the feature points under the online tracking and scanning manner;

step 2: storing the extracted feature points into a feature point buffer sequentially, fitting directly adjacent numbered feature points in the feature point buffer through small line segments; in order to prevent the existence of a corner, being greater than a threshold $\theta_{max}$ and limiting cladding speed, at junctions of small line segments after the small line segment fitting, executing a small line segment smooth task, where the small line segment smooth task refers to introducing a transition arc into a position corresponding to an angle greater than the threshold $\theta_{max}$ between the small line segments for transferring, to achieve an arc transition and improve a processing speed, some of the small line segments are inserted with arc segments to make corresponding starting or ending positions of the some of the small line segments and line segment types of the some of the small line segments change, refreshing information of the small line segment timely after performing the small line segment smooth, where the refreshed small line segments from a cladding trail; and then executing a read-ahead segment number determination task to determine a prospective read-ahead segment number N, after determining the prospective read-ahead segment number N, reading from a current i-th segment to an i+N-th segment in the feature point buffer during performing dynamic prospect, determining an ending speed of each of the small line segments by performing the dynamic prospect, and executing a speed planning task to implement a speed planning of each of the small line segments in the cladding trail;

step 3: installing the industrial camera at a certain angle with the laser cladding head, and the angle making the collection range of the industrial camera follow closely the current cladding position, where the collection range of the industrial camera is within 15 mm from the current cladding position, after an image is collected by the industrial camera, performing a noise reduction for the image through a Gaussian filter, improving a contrast ratio of the image through a gamma image enhancement technology; obtaining a target pixel division threshold by using an OTSU binarization technology, segmenting out a target foreground area by using the target pixel division threshold, where the target foreground area refers to an area corresponding to the pervious melt channel and the current melt channel within a field of view of the industrial camera; extracting edge positions of the pervious melt channel and the current melt channel to achieve a detection purpose; collecting overlapping information between the current melt channel and the previous melt channel and calculating an overlapping rate $\beta$ based on the overlapping information, in a situation that the overlapping rate $\beta$ is not within a threshold range $(\beta_{min}, \beta_{max})$ executing an interpolation and correction task to correct an interpolation result of a next small line segment, transmitting in real-time a corrected value to each of shafts of a robot for implementing correction of the cladding trail; compensating an effect of a thermal deformation of a small line segment to-be-clad by the current melt channel by the current melt channel by using the overlapping information collected by the industrial camera, and implementing a dynamic correction of the cladding trail to achieve a high-accuracy laser cladding for the membrane wall.

In an embodiment, the laser line scanning sensor leads the laser cladding head by a bias distance in the installation space, and the laser line scanning sensor is parallel to the laser cladding head; the laser line scanning sensor is configured to obtain the feature points according to a set collection frequency, convert collected feature point coordinates to an end coordinate system of the robot through a hand-eye conversion matrix, convert the feature point coordinates to a base coordinate system through an end coordinate system to base coordinate system conversion matrix to plan (i.e., control) each of the shafts of the robot during motion of the robot.

In an embodiment, the industrial camera lags behind the laser cladding head by a second bias distance in the installation space, and the industrial camera is installed at a certain angle with the laser cladding head to make the collection range following closely the current cladding position, and the industrial camera is at a distance of 15 mm from the current cladding position.

In an embodiment, the robot-based laser cladding method for membrane wall further includes: converting, by a controller, the cladding overlapping information collected by the industrial camera to the overlapping rate, storing a detection result in an error buffer when the overlapping rate is not within the threshold range $(\beta_{min}, \beta_{max})$; and distributing evenly an error part into interpolation cycles of the next small line segment to correct a problem of the overlapping rate exceeding a limit.

In an embodiment, the feature point buffer and the error buffer are both caching mechanisms, basic information of the feature point buffer includes: a coordinate of a starting point of each of the small line segments, a continuity of the starting point, a coordinate of a terminal point of each of the small line segments, a continuity of the terminal point, a type of each of the small line segments, a length of each of the small line segments, and the error buffer is configured to store information indicating a overlapping rate of adjacent melt channels being exceeding the threshold range in the collection range of the industrial camera.

In an embodiment, the continuity of the starting point and the continuity of the terminal point are both used as one of markers to determine an end of the dynamic prospect.

The disclosure provides a robot-based laser cladding system for membrane wall, includes a data collection system, a data processing system, a detection and correction system, and a motion control system.

The data collection system includes a laser line scanning sensor and an industrial camera, the laser line scanning sensor is configured to periodically collect point cloud contour data of a membrane wall in a motion direction, and transmit the point cloud contour data to a system controller through an Ethernet; the industrial camera is configured to collect overlapping information between a current melt channel and a previous melt channel, and transmit the collected overlapping information to the system controller through the Ethernet.

The data processing system is configured to read the collected point cloud contour data of the membrane wall from the system controller, and perform data processing divided into three steps: in a first step, perform noise reduction on the point cloud contour data, perform fitting processing by using a least squares method and a high-order curve to generate a contour curve of the membrane wall after performing noise reduction, and perform a feature point extraction task to find an extreme point of the high-order curve, as a feature point coordinate of a planned cladding trail; in a second step, convert the feature point coordinate to an end coordinate system of a robot through a coordinate conversion, the feature point coordinate is a built-in coordinate system relative to the laser line scanning sensor; and in a third step, store processed information of the feature point coordinate in a feature point buffer.

The detection and correction system refers to a system part for performing a cladding trail correction according to the overlapping information of the melt channels collected by the industrial camera, and the detection and correction system is configured to online collect the overlapping information after implementing an interpolation of each small line segment, calculate an overlapping rate $\beta$ through the overlapping information and determine whether to correct the cladding trail of a next small line segment, the laser line scanning sensor is configured to eliminate an effect of a thermal deformation generated by the previous melt channel on the current melt channel, due to an existence of a first bias distance between the laser line scanning sensor and the laser cladding head, the cladding trail planned by a scheme for extracting the feature points through the laser line scanning sensor leads the current cladding position one of the first bias distance essentially, thus, during actual cladding, the small line segment being clad by the current melt channel causes the effect of the thermal deformation to the adjacent next small line segment being clad by the current melt channel, and causes a problem of the overlapping rate fluctuation of a cladding trail deviation.

The motion control system is a part, which is configured to transmit an interpolation result to each joint (also referred to as each of shafts of the robot) in each communication cycle to achieve cladding, and determine whether an overlapping rate error over-limit value (i.e., a difference between the overlapping rate and the threshold) exists in a current error buffer before transmitting the interpolation result.

In an embodiment, the industrial camera is configured to on-line collect the overlapping information within the collection range for one time in a situation that the detection and correction system implements a cladding process of the small line segment, and the overlapping rate is calculated by the controller based on the collected overlapping information, and whether it is necessary to correct and compensate the cladding trail of the next small line segment is determined, the above overlapping rate detection and cladding trail correction scheme can effectively improve a cladding effect.

In an embodiment, in a situation that there is the overlapping rate error over-limit value, the motion control system is configured to evenly distribute the overlapping rate error over-limit value into each interpolation cycle, correct a target position, initialize data in the error buffer after transmitting a motion command, and dynamically adjust a cladding trail of the robot, so as to improve the cladding effect.

3. Beneficial Effects are as Follows

Compared with the related art, advantages of the disclosure are as follows.

1. In the disclosure, the laser line scanning sensor is configured to achieve an online planning of the cladding trail by a method of tracking the previous melt channel, the planned cladding trail can perceive the thermal deformation generated by the previous melt channel on a current working area (i.e., the current melt channel); then the industrial camera is configured to online collect the overlapping information of the melt channels to overcome the thermal deformation generated by the current melt channel; the overlapping rate $\beta$ is calculated according to the collected overlapping information, and the overlapping rate $\beta$ is compared with the threshold range ($\beta_{min}$, $\beta_{max}$), if the overlapping rate $\beta$ is not within the threshold range ($\beta_{min}$, $\beta_{max}$), the cladding trail of the next small line segment is corrected to ensure that the cladding overlapping rate can be dynamically adjusted to achieve a better cladding effect.

2. In the disclosure, a speed dynamical prospect is used for performing a speed planning. The above speed dynamical prospect is configured to dynamically adjust the prospective read-ahead segment number N, compared to a planning method with a fixed prospective read-ahead segment number, the cladding speed planed by the speed dynamic prospect is more steady, and cladding quality planed by the speed dynamic prospect is more stable.

3. In the disclosure, a double buffered data interaction mode is used. Point cloud information collected by the laser line scanning sensor is continuously stored in the feature point buffer after performing noise reduction, fitting processing and feature point extraction; the overlapping information of the melt channels is detected by the industrial camera, the overlapping rate $\beta$ is calculated according to the detected overlapping information, the overlapping information greater than $\beta_{max}$ and smaller than $\beta_{min}$ is stored in the error buffer; a planning of the cladding trail, prospect and dynamically correction are ensured by the double buffered data interaction mode, so as to achieve the better cladding effect.

DETAILED DESCRIPTION OF EMBODIMENTS

Technical solutions in embodiments of the disclosure will be clearly and completely described in conjunction with drawings in the embodiments of the disclosure in the follows. Obviously, the described embodiments are merely some embodiments of the disclosure, not all of them.

Embodiment 1

Refers to FIGS. 1-10, a robot-based laser cladding method for membrane wall is provided, data collection is implemented by a laser line scanning sensor 1 and an industrial camera 2; the laser line scanning sensor 1 is configured to track a previous melt channel, and continuously collect contour information of a membrane wall for extracting feature points; and the industrial camera 2 is configured to online detect overlapping situations of melt channels for correcting a cladding trail.

The above data collection includes two stages of laser cladding for membrane wall, and the two stages are a pre-scanning stage and a tracking scanning stage. The pre-scanning stage refers to a process that a laser cladding head does not emit light, a powder feeder does not feed powder, the industrial camera 2 does not collect data, the robot executes a linear motion mode and spatially moves from the laser line scanning sensor 1 flush with a processing position to the laser cladding head flush with the processing position. The tracking scanning stage refers to a process that the laser cladding head emits light, the powder feeder feeds the powder, the industrial camera 2 collects data, and the robot exits the linear motion mode and switches to execute a cladding trail planned online based the feature points. The data collection is performed by the laser line scanning sensor 1 in the two stages.

Figure 4:
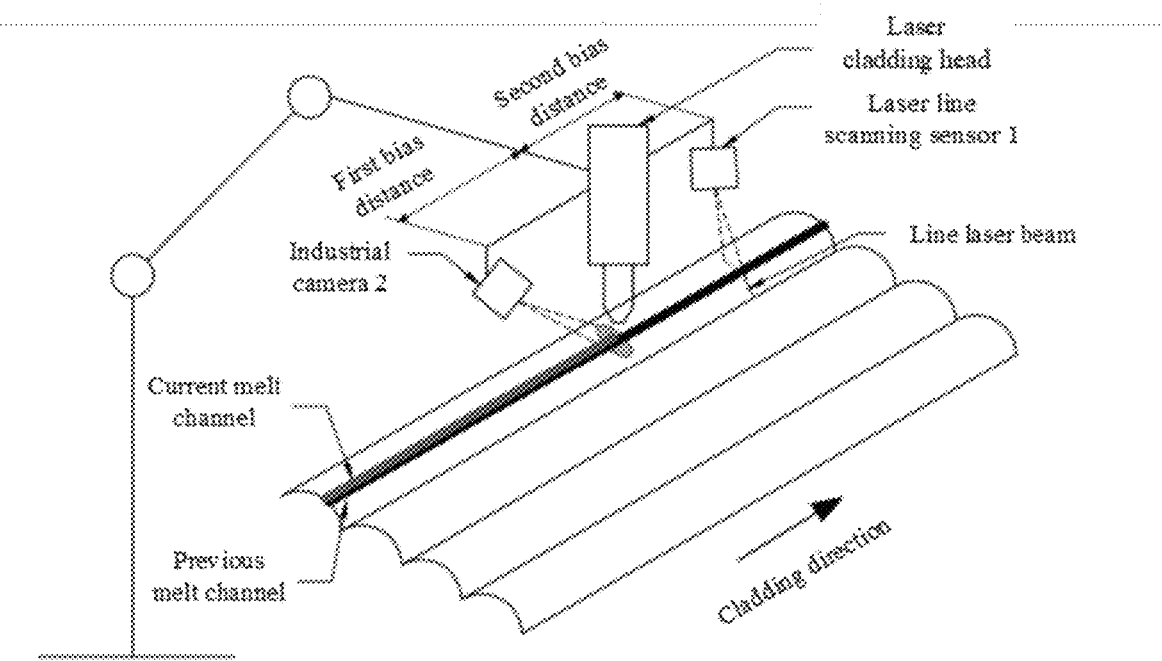
FIG. 4 illustrates a schematic diagram of a cladding process of a robot-based laser cladding method and system for membrane wall based on an embodiment of the disclosure.
Figure 9:
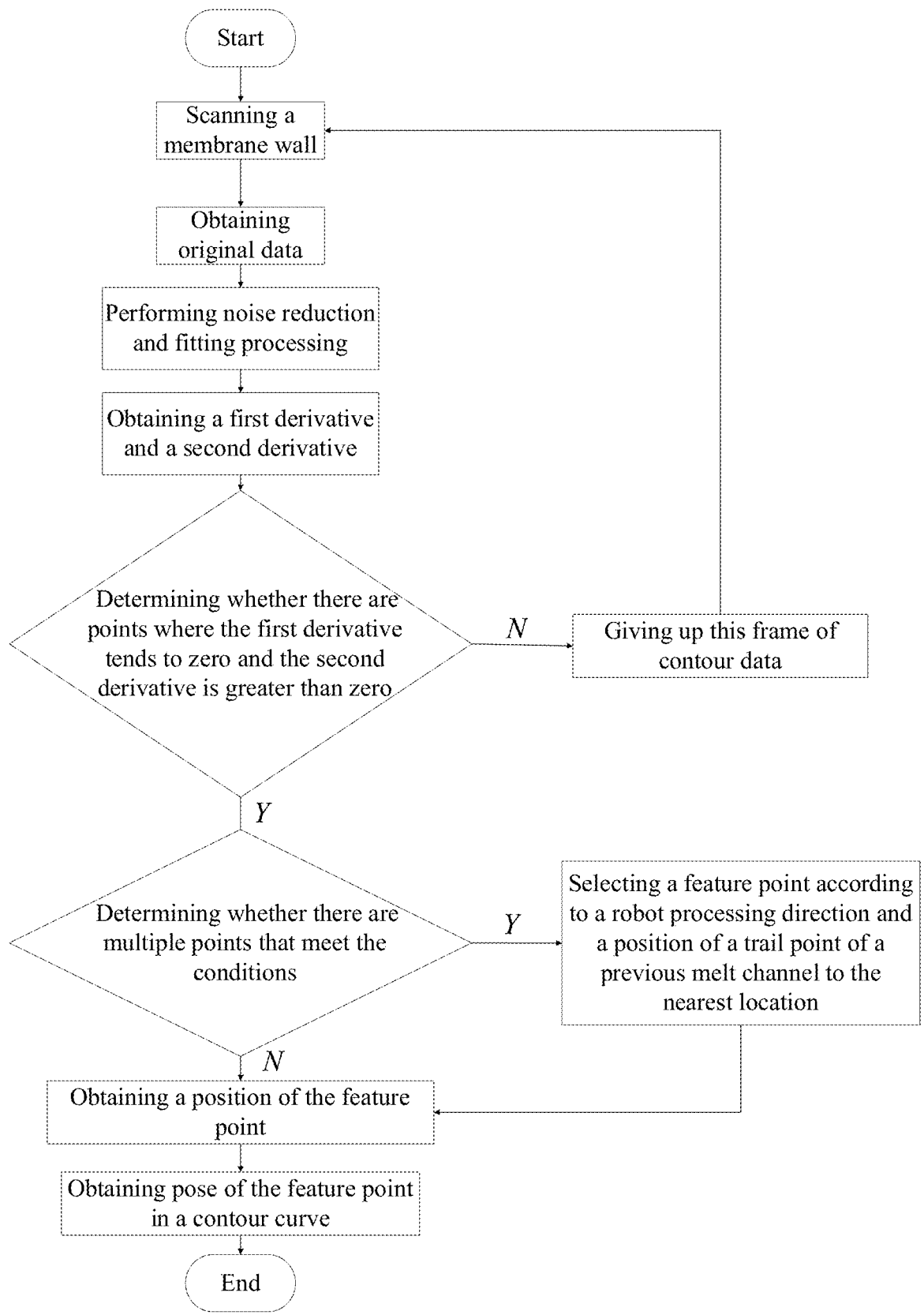
FIG. 9 illustrates a flowchart of a feature point extraction algorithm of a robot-based laser cladding method and system for membrane wall based on an embodiment of the disclosure.
Figure 10:
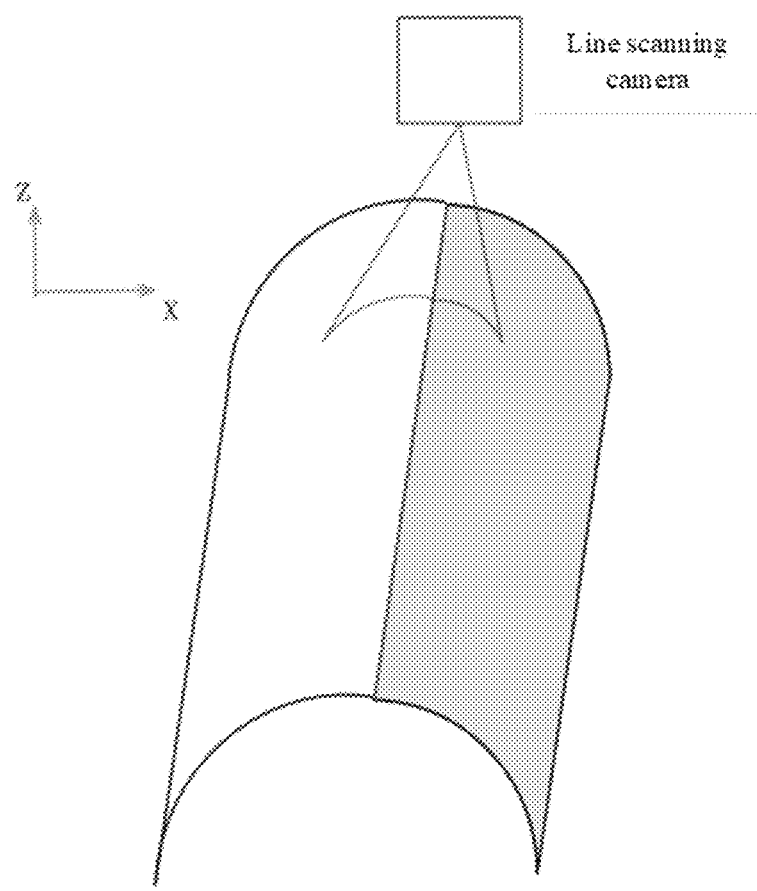
FIG. 10 illustrates a schematic diagram of scanning a membrane wall contour of a robot-based laser cladding method and system for membrane wall based on an embodiment of the disclosure.

A specific data collection method is shown in FIG. 4, a current melt channel (i.e., gray schematic part) described in FIG. 4 is a current melt channel being processed, a previous melt channel (i.e., black schematic part) described in FIG. 4 is an adjacent melt channel that has just been processed before processing the current melt channel. The laser line scanning sensor 1 leads the laser cladding head by a bias distance in an installation space, a line laser beam (i.e., a grey line laser schematic part under the laser line scanning sensor 1 in FIG. 4) and the laser cladding head are parallel to each other. A process flow of point cloud data collected by the laser line scanning sensor 1 is shown in FIG. 9, in order to make the cladding trail smooth, noise reduction is performed on the collected point cloud contour data, the point cloud contour data with severe deviation from contour trail is filtered, and a morphology of a contour of the membrane wall is approximated by using a least squares method and a sixth-order high-order curve after performing noise reduction. As shown in FIG. 10, z is a sixth-degree function of X, formulas of an extraction principle used for feature point extraction of a fitted high-order curve are as follows:

$|z'-0|<e$ $z''>0.$

Figure 8:
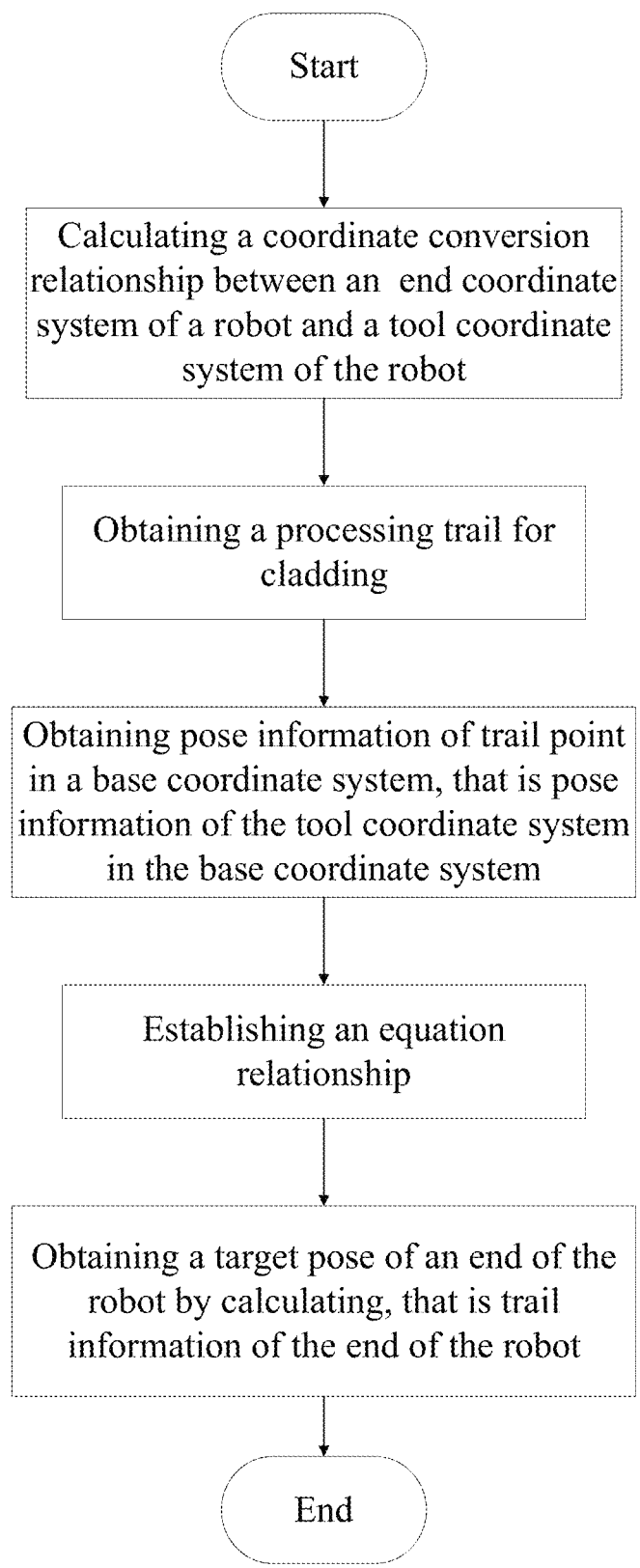
FIG. 8 illustrates a flowchart of a calculation of robot end pose of a robot-based laser cladding method and system for membrane wall based on an embodiment of the disclosure.

Where, e in the above formulas is an error precision, the error precision of the disclosure is set as 0.1 millimeters (mm). A position for extracting feature point is a position of an extreme point of the high-order curve, that is a position where a first derivative tends to zero and a second derivative is greater than zero. If multiple eligible feature points are obtained according to the extraction principle, and the feature points need to be nearby selected according to a processing direction of a robot and a trail point position of the previous melt channel. Then the collected feature point coordinates are converted to a three-dimensional coordinate in an end coordinate system of the robot by using a hand-eye conversion matrix. A method for solving a pose of the robot corresponding to the feature points is shown in FIG. 8, positions and poses of the feature points in the end coordinate system of the robot are obtained.

Figure 1:
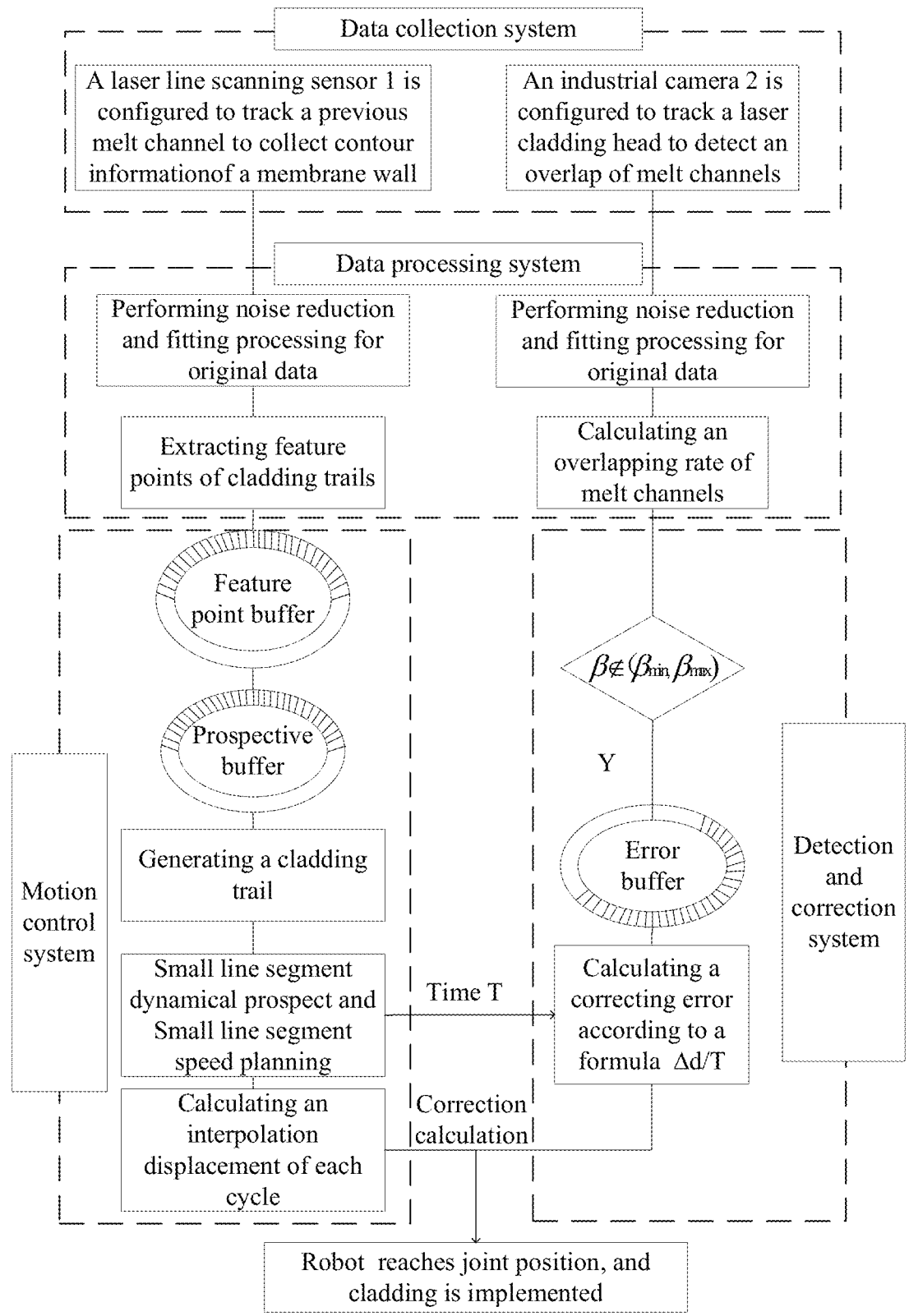
FIG. 1 illustrates a schematic diagram of a specific method and system of a robot-based laser cladding method and system for membrane wall based on an embodiment of the disclosure.
Figure 6:
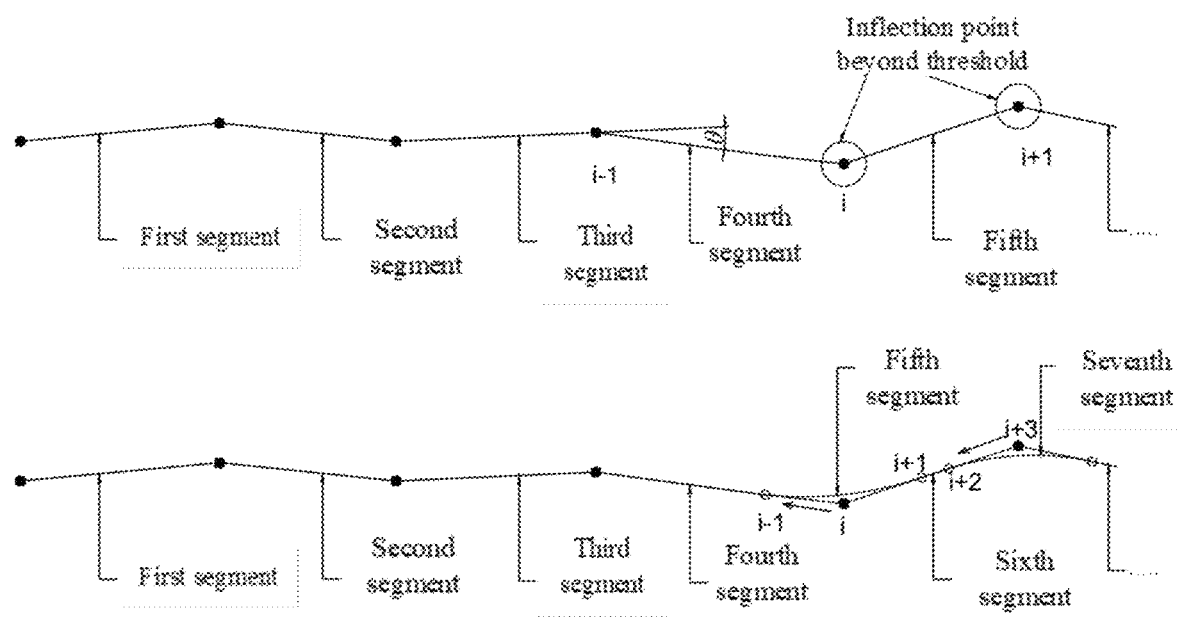
FIG. 6 illustrates a schematic diagram of refreshing small line segments of a robot-based laser cladding method and system for membrane wall based on an embodiment of the disclosure.

As shown in FIG. 1, the laser line scanning sensor 1 is configured to complete the feature point extraction every 8 milliseconds (ms), the feature points are stored in a feature point buffer, and the feature points are fitted through small line segments in the feature point buffer, thus the planned cladding trail ultimately presents as a broken line trail, an existence of angle between the small line segments is caused by the broken line trail, and a cladding speed is reduced by an excessive angle, a small line segments shown in FIG. 6 are smoothly processed for improving the cladding speed, as shown in FIG. 6, a small line segment smooth is performed to improve the cladding speed, when the angle between the small line segments is greater than a threshold by 5 degrees (°), an arc transition is performed, specifically, the threshold is verified by a large number of experiments, and determined by averaging the included angles and adding a redundancy degree.

In a process of laser cladding for a tube row membrane wall, when the angle between the small line segments is smaller than the threshold, an inflection point has little impact on speed in a process of performing speed prospect, and a transition arc is not introduced to process; when the angle between the small line segments is greater than the threshold, a small line segment smooth task is executed and the transition arc is introduced to process, original information of the small line segments is damaged after introducing the transition arc. As shown in FIG. 6, a terminal point of the small line segment is changed from i to i−1 after introducing the transition arc. A type of an original 5$^{th}$ segment small line segment is a straight line, and the type of the original 5$^{th}$ segment small line segment is changed to an arc after introducing the transition arc. Therefore, information of the small line segments in the feature point buffer needs to be refreshed after executing the small line segment smooth task.

Figure 7:
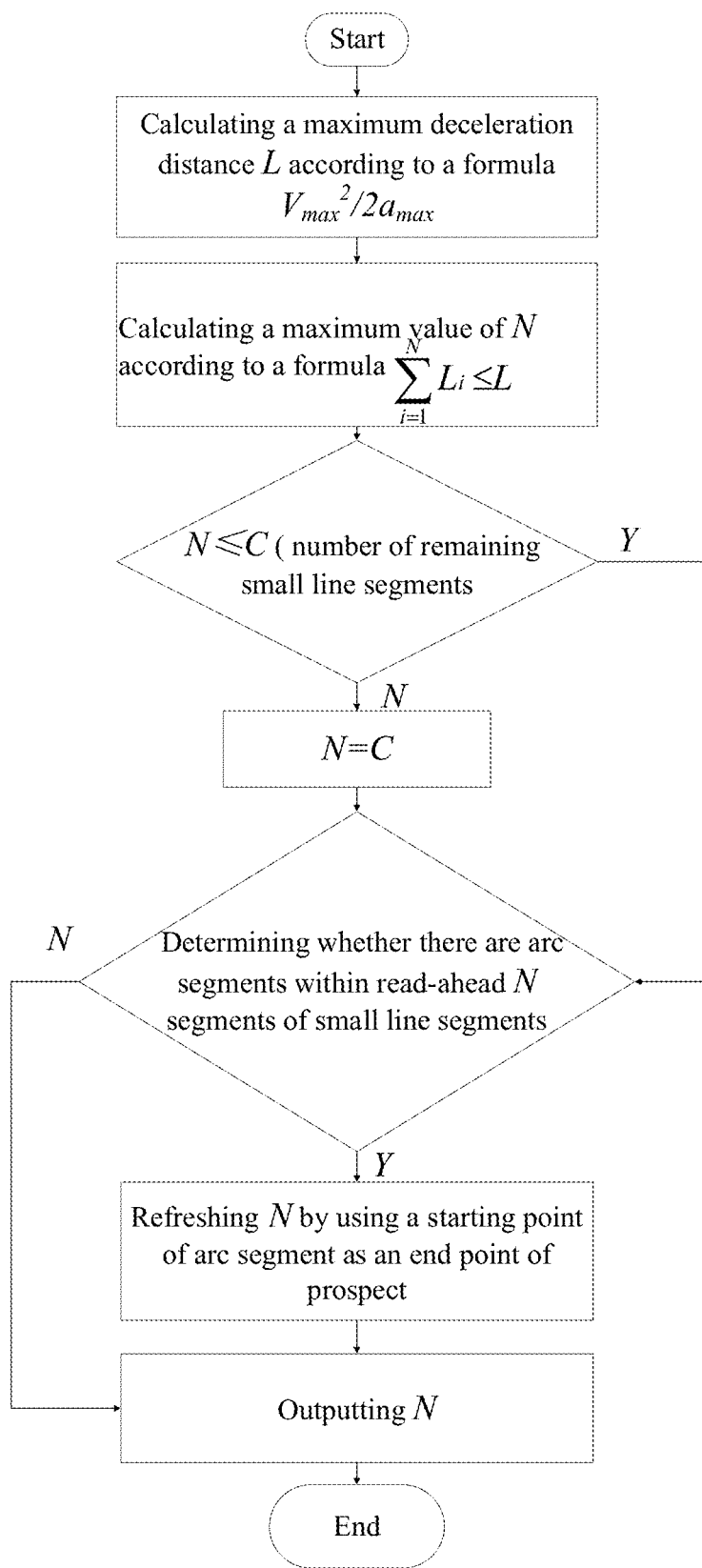
FIG. 7 illustrates a flowchart of a dynamical prospective algorithm of a robot-based laser cladding method and system for membrane wall based on an embodiment of the disclosure.

The small line segments are performed a speed dynamical prospect after refreshing the small line segments in the feature point buffer, a maximum prospective read-ahead segment number N is set as 30 segments, however, an actual prospective read-ahead segment number N is dynamically changing, determination of a value of N is shown in FIG. 7. A limitation of the value of N includes a deceleration distance, a type of the small line segment (end of the read-ahead when encountering the arc), and a segment number C of remaining small line segments. After executing a read-ahead segment number judgement task to determine the prospective read-ahead segment number N, N-segment small line segments are extracted from the feature point buffer to perform the speed dynamic prospect.

Figure 5:
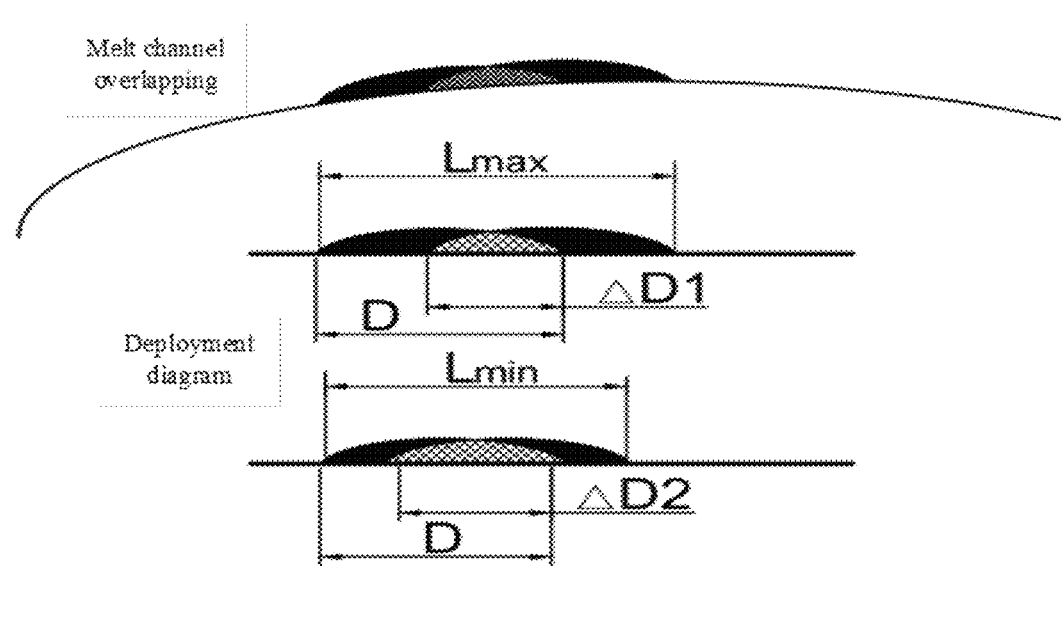
FIG. 5 illustrates a schematic diagram of overlapping melt channel of a robot-based laser cladding method and system for membrane wall based on an embodiment of the disclosure.

A collection range of the industrial camera 2 is configured to detect overlapping situations of the melt channels by tracking the laser cladding head. A melt channel overlap is shown in FIG. 5, an overlapping rate β is a ratio of a repeated part to a width of a single channel during two melt channels cladding, the overlapping situation is detected by detecting a distance L between edges of two overlapped adjacent melt channels online in the disclosure, formulas of a conversion relationship of the distance L and the overlapping rate β in the disclosure are as follows:

$L=2D-\Delta D;$ $\beta=\Delta D/D\times 100\%;$ $\beta=(2D-L)/D\times 100\%.$

Therefore, $L_{max}$ corresponds to $\beta_{min}$, $L_{min}$ corresponds to $\beta_{max}$, and formulas for corresponding relationship are as follows:

$\beta_{min}=(2D-L_{max})/D\times 100\%;$ $\beta_{max}=(2D-L_{min})/D\times 100\%.$ A need of leaving a certain margin for error correction is considered, a correction range of the disclosure includes two situations: $\beta>\beta_{max}$ and $\beta<\beta_{min}$. A to-be-corrected error Δd is calculated when L is within the correction range, and formulas for calculating the to-be-corrected error Δd are as follows:

$\Delta d=L-(L_{max}+L_{min})/2, \beta<\beta_{min};$ $\Delta d=0, \beta_{min}<\beta<\beta_{max};$ $\Delta d=(L_{min}+L_{max})/2-L, \beta>\beta_{max}.$ The above to-be-corrected error Δd is a difference between the distance L and an average of a non-correction range.

Continuous multiple angles without exceeding the threshold are not processed, which causes an accumulation of the error, and detection of the overlapping rate in the disclosure effectively avoids the accumulation of the error. An introduction of the detection of the overlapping rate can ensure a cladding quality to fluctuate dynamically within an allowable range of the error. The distance L is detected to determine whether it is within the correction range, the to-be-corrected error Δd is stored in an error buffer when the distance L is not within the correction range, an interpolation and correction task is executed to performing a cyclic correction, a correction value of each cycle is Δd/T; and T is a total interpolation time of a next small line segment obtained by speed planning and rounding.

After implementing the above correction, final calculated interpolation results are transmitted to each of shafts (i.e., joints) of the robot to perform cladding for the next small line segment.

Figure 2:
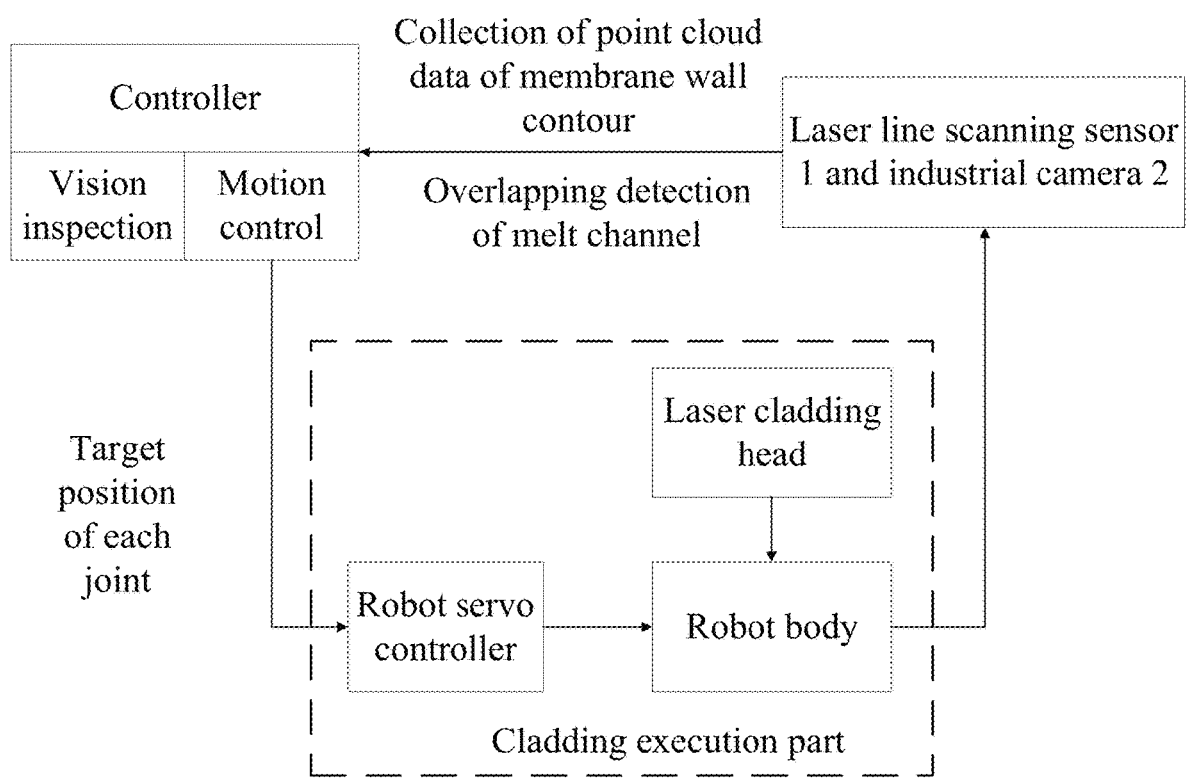
FIG. 2 illustrates a schematic diagram of main components of a robot-based laser cladding system for membrane wall based on an embodiment of the disclosure.
Figure 3:
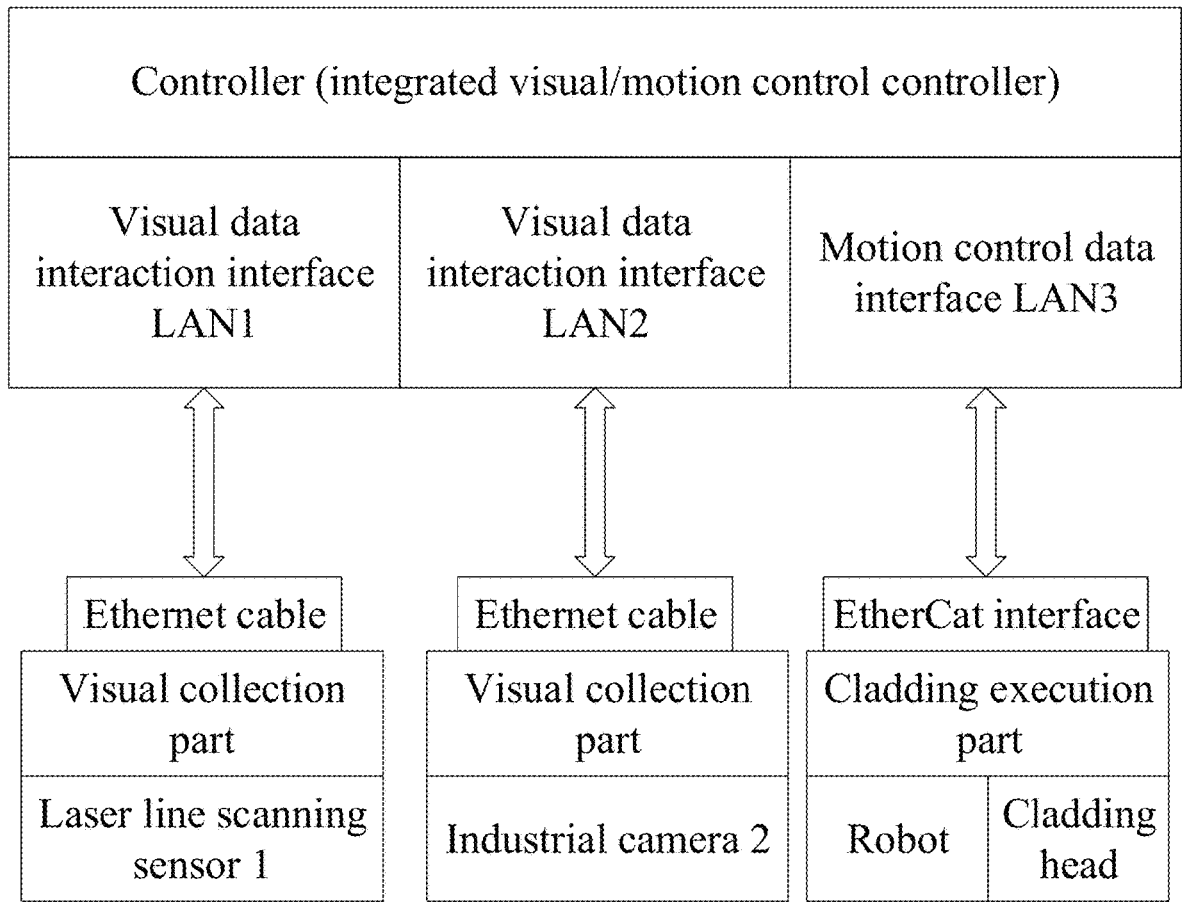
FIG. 3 illustrates a schematic diagram of a communication architecture of a robot-based laser cladding method and system for membrane wall based on an embodiment of the disclosure.

A second typical implementation method provided in the disclosure is shown in FIGS. 1-3, the disclosure provides a robot-based laser cladding system for membrane wall, and the system includes a data collection system, a data processing system, a detection and correction system, and a motion control system.

The data collection system includes a laser line scanning sensor 1 and an industrial camera 2, the laser line scanning sensor 1 is configured to periodically collect point cloud contour data of a membrane wall in a motion direction, and transmit the point cloud contour data to a system controller through an Ethernet; the industrial camera 2 is configured to collect overlapping information between a current melt channel and a previous melt channel, and transmit the collected overlapping information to the system controller through the Ethernet.

The data processing system is configured to read the collected point cloud contour data from the system controller, and perform data processing divided into the following three steps including first to third steps.

In a first step, the point cloud contour data is fitted by using a least squares method and a high-order curve to generate a contour curve of the membrane wall, a feature point extraction task is executed to find an extreme point of the high-order curve, that is a feature point coordinate for planning the cladding trail.

In a second step, position of the above feature point are position of the feature point in a coordinate system of the laser line scanning sensor 1, the position of the feature point is converted to an end coordinate system of the robot by a coordinate conversion; thus, the feature point coordinate based on the laser line scanning sensor 1 is converted to the end coordinate system of the robot through a hand-eye conversion matrix; a feature point pose collection task is executed, a normal vector $a=[a_x, a_y, a_z]^T$ of a feature point can be obtained according to the position of the feature point in the contour curve, in order to process data, a tool coordinate system of the robot is established in the position of the feature point, a tangent vector $n=[n_x, n_y, n_z]^T$ of the feature point is obtained through the contour curve where the feature point located, a vector o is obtained by cross multiplication of the normal vector a and the tangent vector n, by processing the data, the position and the pose of the feature point in the end coordinate system of the robot are obtained, and formula is as follows:

$$T = \begin{bmatrix} n_x & o_x & a_x & p_x \\ n_y & o_y & a_y & p_y \\ n_z & o_z & a_z & p_z \\ 0 & 0 & 0 & 1 \end{bmatrix}.$$

In a third step, processed information of the feature point coordinate is stored in the feature point buffer.

The detection and correction system refers to a system part for performing a cladding trail correction according to the overlapping information of the melt channels collected by the industrial camera 2, and the detection and correction system is configured to online collect the overlapping information after implementing an interpolation of each small line segment, and determine whether to correct the cladding trail of the next small line segment based on the collected overlapping information. the laser line scanning sensor 1 is configured to eliminate an effect of the thermal deformation of the current melt channel generated by the previous melt channel, due to an existence of a first bias distance between the laser line scanning sensor 1 and the laser cladding head, the cladding trail planned by a scheme for extracting the feature points through the laser line scanning sensor 1 leads the current cladding position one of the first bias distance essentially, thus, during actual cladding, the cladding at current position causes the effect of the thermal deformation to the next cladding position of the current melt channel, and causes a problem of the overlapping rate fluctuation of a cladding trail deviation. Aimed at the above problem, an online collection of the overlapping information is achieved by the industrial camera 2, and the overlapping rate is calculated by the controller using the collected information to determine whether it is necessary to correct and compensate the cladding trail of the next small line segment, the above solution can effectively ensure the cladding effect.

The motion control system refers to a system part for transmitting the interpolation result to each joint in each communication cycle to achieve cladding, and an overlapping rate error over-limit value (i.e., a difference between the overlapping rate and the threshold) is determined whether it exists in a current error buffer before transmitting the interpolation result, when the overlapping rate error over-limit value exists, the motion control system is configured to evenly distribute the overlapping rate error over-limit value into each interpolation cycle to correct a target position, initialize data in the error buffer after transmitting a motion command, and dynamically adjust the cladding trail of the robot to improve the cladding effect.

The above are merely illustrated embodiments of the disclosure, however, a scope of protection of the disclosure is not limited to this, any those skilled in the art make equivalent replacements or changes based on technical solutions and inventive concept of the disclosure within a technical scope disclosed by the disclosure shall be covered within the scope of protection of the disclosure.

What is claimed is:

1. A robot-based laser cladding method for membrane wall, comprising:

step 1: installing a laser line scanning sensor and a laser cladding head in parallel with a forward-bias between the laser line scanning sensor and the laser cladding head in a feed direction, wherein a distance of the forward-bias is determined based on a disturbance of cladding powder and splash; installing an industrial camera to make the industrial camera lag behind the laser cladding head in an installation space by a bias distance and to make the industrial camera to have a certain angle relative to the laser cladding head, wherein a collection range of the industrial camera is within 15 millimeters (mm) from a current cladding position; online tracking and scanning a contour of a membrane wall of a previous melt channel by using the laser line scanning sensor, and executing a feature point extraction task to extract feature points defining a trail of a current melt channel, wherein a thermal deformation generated by the previous melt channel tends to deform the contour of the membrane wall, the laser line scanning sensor is configured to extract the feature points in an online tracking and scanning manner, and the thermal deformation generated by the previous melt channel is determined based on information of the feature points under the online tracking and scanning manner;

step 2: storing the extracted feature points into a feature point buffer sequentially, fitting directly adjacent numbered feature points in the feature point buffer through line segments; in order to prevent the existence of an angle between line segments, being greater than a threshold $\theta_{max}$ and limiting a cladding speed after the line segment fitting, executing a line segment smooth task, wherein the line segment smooth task refers to introducing a transition arc into a position corresponding to an angle greater than the threshold $\theta_{max}$ between the line segments, to achieve an arc transition and improve a processing speed, some of the line segments are inserted with arc segments to make corresponding starting or ending positions of the some of the line segments and line segment types of the some of the line segments change; refreshing information of the line segments after performing the line segment smooth task, wherein the refreshed line segments form a cladding trail; and then executing a read-ahead segment number determination task to determine a prospective segment number N, after determining the prospective segment number N, reading from a current i-th segment to an i+N-th segment in the feature point buffer during performing a speed planning, determining an ending speed of each of the line segments by performing the speed planning, and executing a speed planning task to implement a speed planning of each of the line segments in the cladding trail;

step 3: after an image is collected by the industrial camera, performing a noise reduction for the image through a Gaussian filter; improving a contrast ratio of the image through a gamma image enhancement technology; obtaining a target pixel division threshold by using an Otsu binarization technology; segmenting out a target foreground area by using the target pixel division threshold, wherein the target foreground area refers to an area corresponding to the previous melt channel and the current melt channel within a field of view of the industrial camera; extracting edge positions of the previous melt channel and the current melt channel to achieve a detection purpose; collecting overlapping information between the current melt channel and the previous melt channel and calculating an overlapping rate β based on the overlapping information; in a situation that the overlapping rate β is not within a threshold range ($\beta_{min}$, $\beta_{max}$), executing an interpolation and correction task to correct an interpolation result of a next line segment, transmitting in real-time a corrected value to each of shafts of a robot for implementing correction of the cladding trail; compensating an effect of a thermal deformation of a line segment being clad by the current melt channel on a next line segment to-be-clad by the current melt channel by using the overlapping information collected by the industrial camera; and implementing a dynamic correction of the cladding trail to achieve a laser cladding for the membrane wall.

2. The robot-based laser cladding method for membrane wall as claimed in claim 1, wherein the laser line scanning sensor is configured to obtain the feature points according to a set collection frequency, convert collected feature point coordinates to an end coordinate system of the robot through a hand-eye conversion matrix, convert the feature point coordinates to a base coordinate system through an end coordinate system to base coordinate system conversion matrix to plan each of the shafts of the robot during motion of the robot.

3. The robot-based laser cladding method for membrane wall as claimed in claim 1, wherein the cladding overlapping information collected by the industrial camera can be converted into the overlapping rate by a controller, a detection result is stored in an error buffer when the overlapping rate is not within the threshold range ($\beta_{min}$, $\beta_{max}$), and an error part is evenly distributed into interpolation cycles of an adjacent next line segment to correct a problem of the overlapping rate exceeding a limit.

4. The robot-based laser cladding method for membrane wall as claimed in claim 1, wherein the feature point buffer and an error buffer are both caching mechanisms; basic information of the feature point buffer comprises: a coordinate of a starting point of each of the line segments, a continuity of the starting point, a coordinate of a terminal point of each of the line segments, a continuity of the terminal point, a type of each of the line segments, and a length of each of the line segments; and the error buffer is configured to store information indicating an overlapping rate of adjacent melt channels exceeding the threshold range in the collection range of the industrial camera.

5. The robot-based laser cladding method for membrane wall as claimed in claim 4, wherein the continuity of the starting point and the continuity of the terminal point are both used as markers to determine an end of the speed planning.

\* \* \* \* \*